(12) United States Patent
Frenne et al.

(10) Patent No.: US 11,606,800 B2
(45) Date of Patent: *Mar. 14, 2023

(54) WIRELESS DEVICE, A NETWORK NODE AND METHODS THEREIN FOR REPORTING CHANNEL STATE INFORMATION (CSI) IN A RADIO COMMUNICATIONS NETWORK

(71) Applicant: Telefonaktiebolaget L M Ericsson (publ), Stockholm (SE)

(72) Inventors: Mattias Frenne, Uppsala (SE); Qiang Zhang, Täby (SE); Henrik Sahlin, Mölnlycke (SE); Stefan Parkvall, Bromma (SE); Håkan Andersson, Linköping (SE); Johan Furuskog, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/193,077

(22) Filed: Mar. 5, 2021

(65) Prior Publication Data

US 2021/0195606 A1 Jun. 24, 2021

Related U.S. Application Data

(63) Continuation of application No. 15/961,464, filed on Apr. 24, 2018, now Pat. No. 10,945,272, which is a
(Continued)

(51) Int. Cl.
*H04W 4/00* (2018.01)
*H04W 72/08* (2009.01)
(Continued)

(52) U.S. Cl.
CPC ......... *H04W 72/085* (2013.01); *H04L 1/0026* (2013.01); *H04L 1/0035* (2013.01);
(Continued)

(58) Field of Classification Search
CPC ............. H04W 72/085; H04W 72/042; H04W 72/046; H04W 76/27; H04W 4/06; H04L 1/0026; H04L 1/0035
See application file for complete search history.

(56) References Cited

U.S. PATENT DOCUMENTS

| 9,986,573 B2 | 5/2018 | Frenne et al. |
| 2008/0057969 A1 | 3/2008 | Agami et al. |

(Continued)

FOREIGN PATENT DOCUMENTS

| CN | 102624494 A | 8/2012 |
| EP | 2869478 A1 | 5/2015 |

(Continued)

OTHER PUBLICATIONS

Author Unknown, "Technical Specification Group Radio Access Network; Evolved Universal Terrestrial Radio Access (E-UTRA); Physical layer procedures (Release 11)," Technical Specification 36.213, Version 11.4.0, 3GPP Organizational Partners, Sep. 2013, 182 pages.

(Continued)

*Primary Examiner* — Abdelnabi O Musa
(74) *Attorney, Agent, or Firm* — Withrow & Terranova, PLLC

(57) ABSTRACT

A method performed by a wireless device (121, 122) for determining Channel State Information, CSI, estimates to be transmitted in a CSI report for the wireless device (121, 122) to a network node (110) in a radio communications network (100) is provided. The wireless device (121, 122) receives a message comprising an indication to use CSI estimates corresponding to a determined period of time. In response to said message, the wireless device (121, 122) determines CSI estimates to be used in the CSI report to the network node (110) according to the received indication. A wireless device (121, 122) is also described.

(Continued)

A network node (110) and method therein for controlling CSI estimates transmitted by one or more wireless devices (121, 122) in CSI reports to the network node (110) in a radio communications network (100) are also provided.

22 Claims, 3 Drawing Sheets

Related U.S. Application Data continuation of application No. 14/395,137, filed as application No. PCT/SE2014/050779 on Jun. 24, 2014, now Pat. No. 9,986,573.

(51) Int. Cl.

| | | |
|---|---|---|
| *H04W 76/27* | (2018.01) | |
| *H04L 1/00* | (2006.01) | |
| *H04L 43/067* | (2022.01) | |
| *H04W 4/06* | (2009.01) | |
| *H04W 72/04* | (2023.01) | |
| *H04W 72/044* | (2023.01) | |
| *H04W 24/10* | (2009.01) | |

(52) U.S. Cl.
CPC ............ *H04L 43/067* (2013.01); *H04W 4/06* (2013.01); *H04W 72/042* (2013.01); *H04W 72/046* (2013.01); *H04W 76/27* (2018.02); *H04W 24/10* (2013.01)

(56) References Cited

U.S. PATENT DOCUMENTS

| | | | |
|---|---|---|---|
| 2012/0051451 A1 | 3/2012 | Kwon et al. | |
| 2012/0281563 A1 | 11/2012 | Comsa et al. | |
| 2013/0039199 A1* | 2/2013 | Liao | H04B 7/024 370/252 |
| 2013/0196675 A1 | 8/2013 | Xiao et al. | |
| 2013/0310100 A1 | 11/2013 | Lee et al. | |
| 2014/0133333 A1 | 5/2014 | Liu et al. | |
| 2014/0192917 A1 | 7/2014 | Nam et al. | |
| 2015/0049625 A1 | 2/2015 | Kim et al. | |
| 2015/0133112 A1* | 5/2015 | Wang | H04W 72/042 455/426.1 |
| 2015/0146558 A1 | 5/2015 | Yi et al. | |
| 2015/0208266 A1* | 7/2015 | Jung | H04B 17/336 370/252 |
| 2015/0333893 A1* | 11/2015 | Lee | H04L 1/0026 370/252 |
| 2015/0359019 A1* | 12/2015 | Chen | H04W 36/0058 370/329 |
| 2016/0212786 A1 | 7/2016 | Hwang et al. | |
| 2016/0270091 A1* | 9/2016 | Frenne | H04W 72/042 |
| 2018/0242336 A1 | 8/2018 | Frenne et al. | |

FOREIGN PATENT DOCUMENTS

| | | |
|---|---|---|
| RU | 2467515 C2 | 11/2012 |
| RU | 2477586 C2 | 3/2013 |
| WO | 2009123549 A2 | 10/2009 |
| WO | 2012111992 A1 | 8/2012 |
| WO | 2012136450 A1 | 10/2012 |
| WO | 2013190776 A1 | 12/2013 |
| WO | 2014007512 A1 | 1/2014 |
| WO | 2014081262 A1 | 5/2014 |

OTHER PUBLICATIONS

Author Unknown, "Technical Specification Group Radio Access Network; Evolved Universal Terrestrial Radio Access (E-UTRA); Physical layer procedures (Release 11)," Technical Specification 36.213, Version 11.7.0, 3GPP Organizational Partners, Jun. 19, 2014, 182 pages.
Author Unknown, "Technical Specification Group Radio Access Network; Evolved Universal Terrestrial Radio Access (E-UTRA); Radio Resource Control (RRC); Protocol Specification (Release 12)," Technical Specification 36.331, Version 12.1.0, 3GPP Organizational Partners, Mar. 19, 2014, 356 pages.
Non-Final Office Action for U.S. Appl. No. 14/395,137, dated Jul. 13, 2016, 16 pages.
Final Office Action for U.S. Appl. No. 14/395,137, dated Dec. 14, 2016, 20 pages.
Advisory Action for U.S. Appl. No. 14/395,137, dated Mar. 16, 2017, 3 pages.
Non-Final Office Action and Examiner-Initiated Interview Summary for U.S. Appl. No. 14/395,137, dated Jul. 28, 2017, 15 pages.
Applicant Initiated Interview Summary for U.S. Appl. No. 14/395,137, dated Sep. 27, 2017, 3 pages.
Notice of Allowance for U.S. Appl. No. 14/395,137, dated Jan. 24, 2018, 9 pages.
Result of Consultation for European Patent Application No. 14739980, dated May 26, 2017, 5 pages.
Result of Consultation for European Patent Application No. 14739980, dated Jul. 13, 2017, 9 pages.
Summons to Attend Oral Proceedings for European Patent Application No. 14739980.2, mailed Feb. 12, 2018, 12 pages.
Notification of Reasons for Refusal for Japanese Patent Application No. 2016-575059, dated Feb. 6, 2018, 9 pages.
Notification of Reasons for Refusal for Japanese Patent Application No. 2016-575059, dated Jun. 12, 2018, 7 pages.
International Search Report and Written Opinion for PCT/SE2014/050779, dated Mar. 18, 2015, 15 pages.
International Preliminary Report on Patentability for International Patent Application No. PCT/SE2014/050779, dated Jan. 5, 2017, 12 pages.
Non-Final Office Action for U.S. Appl. No. 15/961,464, dated Apr. 25, 2019, 14 pages.
Final Office Action for U.S. Appl. No. 15/961,464, dated Oct. 1, 2019, 14 pages.
Non-Final Office Action for U.S. Appl. No. 15/961,464, dated Jan. 21, 2020, 14 pages.
Final Office Action for U.S. Appl. No. 15/961,464, dated Jun. 4, 2020, 15 pages.
Notice of Allowance for U.S. Appl. No. 15/961,464, dated Aug. 26, 2020, 9 pages.
First Office Action for Chinese Patent Application No. 201480080151.0, dated Mar. 25, 2019, 17 pages.
Extended European Search Report for European Patent Application No. 18206110.1, dated Dec. 12, 2018, 16 pages.
Decision to Grant for Japanese Patent Application No. 2016-575059, dated Sep. 11, 2018, 6 pages.
Search Report for Russian Patent Application No. 2017101887/08, dated Mar. 16, 2018, 2 pages.
Advisory Action for U.S. Appl. No. 15/961,464, dated Dec. 11, 2019, 3 pages.

* cited by examiner

WIRELESS DEVICE, A NETWORK NODE AND METHODS THEREIN FOR REPORTING CHANNEL STATE INFORMATION (CSI) IN A RADIO COMMUNICATIONS NETWORK

This application is a continuation of U.S. patent application Ser. No. 15/961,464, filed Apr. 24, 2018, now U.S. Pat. No. 10,945,272 B2, which is a continuation of U.S. patent application Ser. No. 14/395,137, filed Oct. 17, 2014, now U.S. Pat. No. 9,986,573, which is a 35 U.S.C. § 371 national phase filing of International Application No. PCT/SE2014/050779, filed Jun. 24, 2014, the disclosures of which are incorporated herein by reference in their entireties.

TECHNICAL FIELD

Embodiments herein relate to reporting Channel State Information, CSI, in a radio communications network. In particular, embodiments herein relate to a wireless device and a method therein for determining CSI estimates to be transmitted to a network node in a radio communications network, and to a network node and a method therein for controlling CSI estimates transmitted by one or more wireless devices to the network node in a radio communications network.

BACKGROUND

In a typical radio communications network, wireless devices, also known as mobile stations, terminals, and/or User Equipments, UEs, communicate via a Radio Access Network, RAN, with one or more core networks. The RAN covers a geographical area which is divided into cell areas, with each cell area being served by a base station, e.g. a radio base station, RBS, or network node, which in some networks may also be called, for example, a "NodeB", "eNodeB" or "eNB". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. One radio base station may have one or more cells. The base stations communicate over the air interface operating on radio frequencies with the user equipments within range of the base stations.

A Universal Mobile Telecommunications System, UMTS, is a third generation mobile communication system, which evolved from the second generation, 2G, Global System for Mobile Communications, GSM. The UMTS terrestrial radio access network, UTRAN, is essentially a RAN using wideband code division multiple access, WCDMA, and/or High Speed Packet Access, HSPA, for user equipments. In a forum known as the Third Generation Partnership Project, 3GPP, telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a radio network controller, RNC, or a base station controller, BSC, which supervises and coordinates various activities of the plural base stations connected thereto. The RNCs are typically connected to one or more core networks.

Specifications for the Evolved Packet System, EPS, have been completed within the $3^{rd}$ Generation Partnership Project, 3GPP, and this work continues in the coming 3GPP releases. The EPS comprises the Evolved Universal Terrestrial Radio Access Network, E-UTRAN, also known as the Long Term Evolution, LTE, radio access, and the Evolved Packet Core, EPC, also known as System Architecture Evolution, SAE, core network. E-UTRAN/LTE is a variant of a 3GPP radio access technology wherein the radio base station nodes are directly connected to the EPC core network rather than to RNCs. In general, in E-UTRAN/LTE the functions of a RNC are distributed between the radio base stations nodes, e.g. eNodeBs in LTE, and the core network. As such, the Radio Access Network, RAN, of an EPS has an essentially "flat" architecture comprising radio base station nodes without reporting to RNCs.

In a radio communications network, there is a need for a radio base station to measure the channel conditions in order to know what transmission parameters to use when transmitting to a wireless device. These parameters may comprise, e.g., modulation type, coding rate, transmission rank, and frequency allocation. This also applies to uplink as well as downlink transmissions.

A scheduler that makes the decisions on the transmission parameters is typically located in the radio base station. Hence, the scheduler may measure channel properties of the uplink directly using known reference signals that the wireless devices transmit. These measurements may then form a basis for the uplink scheduling decisions that the radio base station makes, which are then sent to the wireless devices via a downlink control channel.

However, for the downlink, the radio base station is unable to measure any channel parameters in a Frequency-Division Duplex, FDD, mode of operation. In a Time-Division Duplex, TDD, mode of operation, an uplink measurement might be used in downlink. Due to calibration issues, however, these uplink measurements might not reflect the downlink channel used, and therefore, may not be well suited to be used as measurements of the downlink channel conditions.

Therefore, the radio base station must instead rely on information about the channel conditions that the wireless devices may gather and subsequently send back to the radio base station. This so-called Channel-State Information, CSI, is obtained in the wireless devices by measuring on known reference symbols, such as, Channel-State Information Reference Symbols, CSI-RS, transmitted in the downlink (see e.g. 3GPP TS 36.213 V11.4.0).

The CSI-RS resources are specifically configured for each wireless device by using Radio Resource Control, RRC, signalling. A resource is a group of resource elements in a certain subframe that occurs periodically, for instance every 20th subframe. There is a possibility to configure both Non-Zero Power, NZP, CSI-RS resources and Zero Power, ZP, CSI-RS resources. A ZP CSI-RS resource is simply an unused radio resource that can be matched to a NZP CSI-RS in an adjacent radio base station. This may then be used to improve the SINR for the CSI-RS measurements in the cell of the adjacent radio base station. However, the ZP CSI-RS resources may also be referred to or used as CSI-Interference Management, IM, resources. These are defined on the same physical locations in the time/frequency grid as the CSI-RS, but with zero power. These are intended to give a wireless device the possibility to measure the power of interfering signals without having it overlaid on top of a CSI-RS signal, which is usually much stronger than any surrounding interference.

Each wireless device may be configured with one, three or four different CSI processes. Each CSI process is associated with CSI-RS resources and CSI-IM resources. These CSI resources may be configured in the wireless device by RRC signalling that may occur periodically, see e.g. 3GPP TS 36.213 V11.4.0, 2013-09, Sections 7.2.5-7.2.6. For example, an RRC configuration message may be transmitted periodically every 5 ms, i.e. every 5th subframe. Alternatively, the RRC configuration message may be sent in an aperiodic manner, or may be triggered in a control message from the radio base station to a wireless device.

If only one CSI process is used, then it is common for the network to let the CSI-IM reflect the interference from all other radio base stations, i.e. the cell of the serving radio base station uses a ZP CSI-RS that overlaps with the CSI-IM, but in other adjacent radio base stations, there is no ZP CSI-RS on these resources. In this way, the wireless device may measure the interference from adjacent cells using measurements in the CSI-IM resource.

If more than one CSI processes are configured for the wireless device, then it is possible for the network to also configure a ZP CSI-RS in the adjacent radio base station that overlaps with a CSI-IM for the CSI process configured for the wireless device. In this way, the wireless device may feedback accurate CSI estimates also for the case when this adjacent cell is not transmitting. Hence, measurements to support coordinated scheduling between radio base stations is enabled with the use of multiple CSI processes. One CSI process feeds back CSI estimates for the full interference case and the other CSI process feeds back CSI estimates for the case when an adjacent cell, preferably a strong interfering cell, is muted. As mentioned above, up to four CSI processes may be configured for a wireless device, thereby enabling feedback of four different transmission hypotheses.

If a CSI process is configured for a wireless device, the wireless device may use an associated buffer or memory comprising one or multiple CSI measurements used to determine CSI estimates of the CSI process. However, how these CSI estimates are determined from the CSI measurements are up to the implementation of the wireless device.

In LTE, the format of the CSI reports is specified in detail and comprises CSI estimates in the form of Channel-Quality Indicator(s) (CQI), Rank Indicator (RI), and Precoding Matrix Indicator (PMI). The quality and reliability of the CSI estimates, e.g. CQI, RI and PMI, are crucial for the radio base station in order to make the best possible scheduling decisions for the upcoming downlink transmissions.

SUMMARY

It is an object of embodiments herein to improve reporting of Channel State Information, CSI, in a radio communications network.

According to a first aspect of embodiments herein, the object is achieved by a method performed by a wireless device for determining CSI estimates to be transmitted in a CSI report for at least one CSI process configured for the wireless device to a network node in a radio communications network. The wireless device receives a message comprising an indication to discard existing CSI estimates and/or an indication to use CSI estimates corresponding to a determined period of time. Then, the wireless device determines CSI estimates to be used in the CSI report to the network node according to the received indication.

According to a second aspect of embodiments herein, the object is achieved by a wireless device for determining CSI estimates to be transmitted in a CSI report for at least one CSI process configured for the wireless device to a network node in a radio communications network. The wireless device is configured to receive a message comprising an indication to discard existing CSI estimates and/or an indication to use CSI estimates corresponding to a determined period of time. The wireless device is also configured to determine CSI estimates to be used in the CSI report to the network node according to the received indication.

According to a third aspect of embodiments herein, the object is achieved by a method performed by a network node for controlling CSI estimates transmitted by one or more wireless devices in CSI reports of at least one CSI process configured for the one or more wireless devices to the network node in a radio communications network. The network node determines that the CSI estimates from the one or more wireless devices are no longer valid due to change in at least one transmission condition. Then, the network node transmits, to the one or more wireless devices, a message comprising an indication to discard existing CSI estimates and/or an indication to use CSI estimates corresponding to a determined period of time.

According to a fourth aspect of embodiments herein, the object is achieved by a network node for controlling CSI estimates transmitted by one or more wireless devices in CSI reports of at least one CSI process configured for the one or more wireless devices to the network node in a radio communications network. The network node is configured to determine that the CSI estimates from the one or more wireless devices are no longer valid due to change in at least one transmission condition. Also, the network node is configured to transmit, to the one or more wireless devices, a message comprising an indication to discard existing CSI estimates and/or an indication to use CSI estimates corresponding to a determined period of time.

According to a fifth aspect of embodiments herein, the object is achieved by a computer program, comprising instructions which, when executed on at least one processor, cause the at least one processor to carry out the method described above. According to a sixth aspect of embodiments herein, the object is achieved by a carrier containing the computer program described above, wherein the carrier is one of an electronic signal, optical signal, radio signal, or computer readable storage medium.

By transmitting a message to discard existing CSI estimates and/or an indication to use CSI estimates corresponding to a determined period of time, the network node is able to control the lifetime of the CSI measurements in the wireless device. Thus, the network node is able to ensure that CSI estimates reported back from the wireless device based on these CSI measurements are not corrupted by CSI measurements performed previous to a change in a transmission condition to the wireless device, which improves the reliability of CSI estimates, while at the same time reducing the number of RRC reconfiguration messages having to be transmitted, which improves the latency and mobility of the wireless device in the radio communications network.

Hence, the reporting of Channel State Information, CSI, in a radio communications network is improved.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

Figure 1:
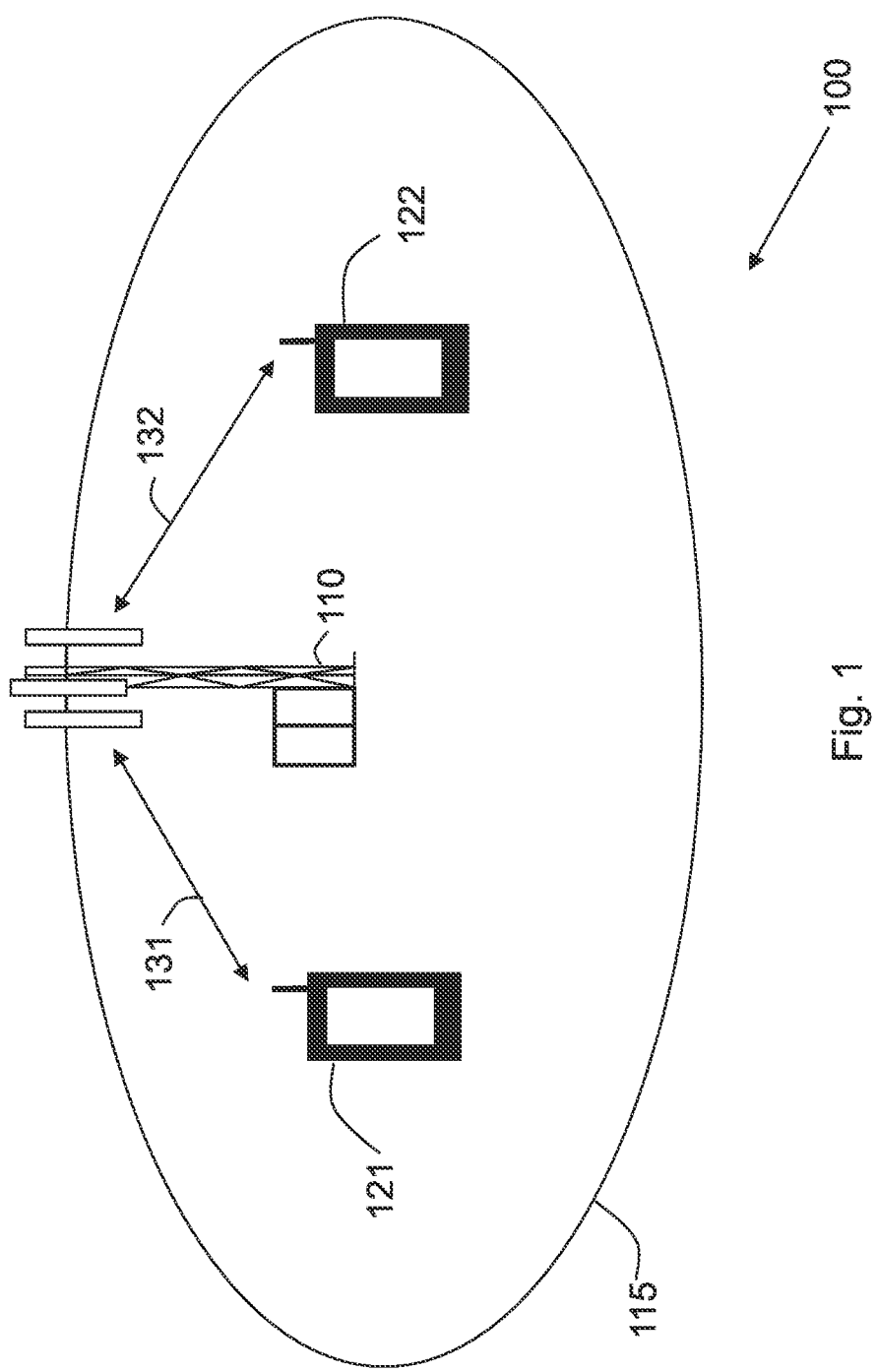
FIG. 1 is a schematic block diagram illustrating embodiments of network nodes in a radio communications network.

The figures are schematic and simplified for clarity, and they merely show details which are essential to the understanding of the embodiments presented herein, while other details have been left out. Throughout, the same reference numerals are used for identical or corresponding parts or steps.

FIG. 1 shows an example of a radio communications network 100 in which embodiments herein may be implemented. Although illustrated in FIG. 1 as an LTE network, the radio communications network 100 may be any wireless communication system, such as, LTE-Advanced, Wideband Code-Division Multiple Access (WCDMA), Global System for Mobile communications/Enhanced Data rate for GSM Evolution (GSM/EDGE), Worldwide Interoperability for Microwave Access (WiMax), Ultra Mobile Broadband (UMB) or GSM network, or other 3GPP cellular network or system. The radio communications system 100 comprises the network node 110.

The network node 110 may e.g. be an eNB, eNodeB, or a Home Node B, a Home eNode B, femto Base Station (BS), pico BS or any other network unit capable to serve a wireless device in the radio communications system 100. The network node 110 may also be e.g. a radio base station, a base station controller, a network controller, a relay node, a repeater, an access point, a radio access point, a Remote Radio Unit (RRU) or a Remote Radio Head (RRH). Furthermore, the network node 110 comprises one or more antennas for wireless radio communication with wireless devices located within their coverage range; that is, the network node 110 may use one or more of its antennas to provide radio coverage within its cell 115.

A cell may be seen as a geographical area where radio coverage is provided by radio base station equipment at a base station site or at remote locations by Remote Radio Units (RRU). The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying each cell uniquely in the whole radio communication network 100 may also be broadcasted in the cell. The network node 110 communicates over the air or radio interface operating on radio frequencies with the wireless devices within range of the network node 110.

A first and a second wireless device 121, 122 are located within the cell 115. The wireless devices 121, 122 are configured to communicate within the radio communications network 100 via the network node 110 over a radio link 131 when present in the cell 101 served by the network node 110. The wireless devices 121, 122 may e.g. be any kind of wireless device such as a mobile phone, a cellular phone, a Personal Digital Assistant (PDA), a smart phone, a tablet, a sensor equipped with a wireless device, Laptop-Mounted Equipment (LME) (e.g. USB), Laptop-Embedded Equipment (LEE), Machine-Type-Communication (MTC) device, a wireless device with D2D capability, Customer Premises Equipment (CPE), etc.

Furthermore, although embodiments below are described with reference to the scenario of FIG. 1, this scenario should not be construed as limiting to the embodiments herein, but merely as an example made for illustrative purposes.

As part of developing the embodiments herein, it has been noticed that the LTE standard does not specify in detail how wireless devices should obtain and/or average CSI measurements from multiple time instants. This means that wireless devices will measure over a time frame that is unknown to the network node and may combine several measurements in a proprietary way in order to create the CSI estimates of the CSI report that is then transmitted to the network node. It follows that the actual process of how the received CSI estimates are gathered, over which time frame, and how they are calculated, by the wireless device is not known to the network node. This makes it difficult for the network node to evaluate this information, and hence, make the best possible downlink scheduling decisions. Hence, there is a need to improve the reliability of CSI estimates.

Furthermore, in emerging radio communications technology, the use of array antennas and beamforming is a key feature. Such radio communications technology enables a network node to transmit, and receive, signal transmissions in specific spatial directions, known as beams. Although this technology is still under development, it is likely that individual transmit beams must somehow be possible to identify in the wireless device. One solution to this would be to use beam-specific reference symbols, BRS, or CSI-RS resources that are associated with a given beam or set of beams. Hence, the CSI-RS resources may be beam-formed/precoded to reflect the channel when receiving data using the beam. The control of the transmit beam directions is handled in the network node as part of the downlink scheduling. It should also be noted that the direction of the used beam for the wireless device may change from Transmission-Time Interval, TTI, to TTI.

Therefore, in such radio communications networks, the problem of "stale" or outdated CSI estimates in the wireless device will become more pronounced, since which beam, or beams, that covers the wireless device may change completely between TT's. A reason for this is that a beam may be very narrow in angular beam-width, and the network node may need to change the transmitting beam used for a wireless device very often when the wireless device moves through the cell. Also, changing beams will then also require frequent RRC reconfigurations of the used CSI-RS resources for the wireless device since the CSI-RS are transmitted in beams. Hence, another issue is that of frequent RRC reconfigurations being needed to support beamformed CSI-RS together with mobility of the wireless device.

In accordance with embodiments described herein, these issues are addressed by allowing the network to control the lifetime of CSI measurements in the wireless device, by transmitting a message to the wireless device to discard existing CSI estimates and/or an indication to use CSI estimates corresponding to a determined period of time, when there is a change in at least one transmission condition for the wireless device. In this way, the network node is able to ensure that CSI estimates reported back from the wireless device are not corrupted by CSI measurements performed previous to the change. Hence, the reliability of CSI estimates in a radio communications network is improved.

In addition, this will also reduce the need for transmitting RRC reconfiguration messages in the radio communications network in order to reconfigure the CSI-RS, since the CSI measurements may be reset using this type of message instead. This will improve latency and mobility of the wireless device in the radio communications network.

Hence, the reporting of CSI in a radio communications network is thereby improved.

Example of embodiments of a method performed by a network node 110 for controlling Channel State Information, CSI, estimates transmitted by one or more wireless devices 121, 122 in CSI reports of at least one CSI process configured for the one or more wireless devices 121, 122 to the network node 110 in a radio communications network 100, will now be described with reference to the flowchart depicted in FIG. 2.

Figure 2:
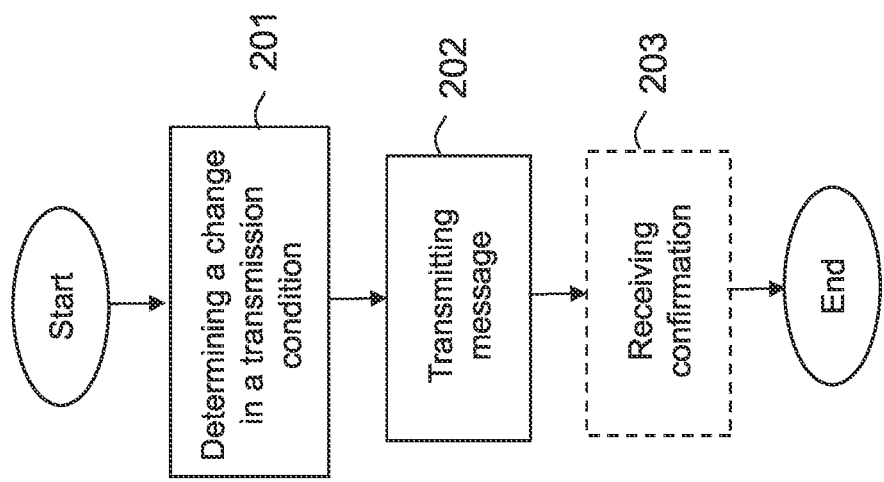
FIG. 2 is a flowchart depicting embodiments of a method in a network node.

FIG. 2 illustrates an example of actions or operations which may be taken by the network node 110. However, it should also be noted that these actions or operations may also be performed by a centralized network node in the radio communications network 100, such as, e.g. a core network node, a radio network controller, a Radio Resource Management, RRM, server, an Operations Support System, OSS, node or the like. The centralized network node may also be e.g. an eNB controlling distributed Remote Radio Units, RRUs, via e.g. a Common Public Radio Interface, CPRI, or an eNB controlling radio heads over an active Distributed Antenna System, DAS, network. The method may comprise the following actions.

Action 201

The network node 110 first determines that the CSI estimates from the one or more wireless devices 121, 122 are no longer valid due to change in at least one transmission condition.

In some embodiments, the network node 110 may be configured for beamforming transmissions to the one or more wireless devices 121, 122 in the radio communications network 100. In this case, the change in the at least one transmission condition may be a change in transmitting beams used in beamforming transmissions to the one or more wireless devices 121, 122. For example, this may be advantageous when the CSI-RS configuration has not changed and the one or more wireless devices 121, 122 should keep measuring on the same CSI-RS, but the transmission beams comprising the CSI-RS are pointing in new directions.

Alternatively, the change in the at least one transmission condition is a change in the traffic situation in the cell 115 in which the one or more wireless devices 121, 122 are located. For example, the network node 110 may become aware of, or determine, that the traffic situation for wireless devices in the current cell 115, or other cells adjacent to the cell 115, has changed, thus requiring new CSI measurement to be performed in the one or more wireless device 121, 122 in order for the CSI estimates in the CSI report to properly reflect the current channel conditions.

Another option is that the change in the at least one transmission condition is a change in the determined period of time. This may, for example, be that the desired periodicity has changed in the network node 110 for the CSI measurements performed in the one or more wireless devices 121, 122.

Action 202

Following the determination in Action 201, the network node 110 transmits, to the one or more wireless devices 121, 122, a message comprising an indication to discard existing CSI estimates and/or an indication to use CSI estimates corresponding to a determined period of time. This means, for example, that the network node 110 may transmit a message to the one or more wireless device 121 to flush CSI buffers corresponding to one or more particular CSI processes. Advantageously, this may be performed without the having to transmit RRC reconfiguration messages to the one or more wireless devices 121, 122 in the radio communications network 100.

The message may, for example, comprise the numbers or identities of the one or more CSI process whose CSI buffers should be flushed. However, the message may also, for example, also explicitly indicate to the one or more wireless devices 121, 122 to flush and restart all CSI measurements, so the CSI buffers of all CSI processes are flushed.

Consequently, the network node 110 may thus cause the one or more wireless device 121 to, for example, stop accumulating and averaging CSI measurements to form the CSI estimates for one or more CSI processes, and begin over again with empty CSI buffers to collect new CSI measurements forming new CSI estimates for the one or more CSI processes.

In some embodiments, the message may comprise an indication to discard CSI estimates determined via at least CSI-Reference Symbol, CSI-RS, resources associated with the at least one CSI process. This advantageously enables the network node 110 to cause the one or more wireless devices 121, 122 to flush only the CSI-RS buffers of the at least one CSI process, i.e. CSI buffers comprising CSI measurements determined via the CSI-RS resources or Non Zero Power, NZP, CSI-RS resources. Thus, while these CSI-RS buffers are reset, the one or more wireless devices 121, 122 may keep the content of the CSI-IM buffers, i.e. CSI buffers comprising CSI measurements determined via the CSI-IM resources or Zero Power, NZP, CSI-RS resources.

Alternatively, in some embodiments, the message may comprise an indication to discard CSI estimates determined via at least CSI-Interference Measurement, CSI-IM, resources associated with the at least one CSI process. This advantageously enables the network node 110 to cause the one or more wireless devices 121, 122 to flush only the CSI-IM buffers of the at least one CSI process.

According to some embodiments, the message may be transmitted as part of a Radio Resource Control, RRC, reconfiguration message to the at least one wireless device 121 in order to reconfigure the at least one CSI process. For example, as soon as a CSI process is reconfigured, which is typically controlled by higher-layer signalling from the network node 110, the network node 110 may transmit the message. This may, for example, be performed when reconfiguring one particular CSI process, but flushing the CSI buffers of at least one other CSI process. Alternatively, the network node 110 may also include the message as a mandatory part of the reconfiguration message.

The message may also be transmitted to the at least one wireless device 121 as part of a broadcasted reconfiguration message in order to reconfigure the at least one CSI process. This means that the message may, for example, be broadcasted to some or all wireless devices 121, 122 in a cell, e.g. cell 115. This would result in a reduced signalling overhead compared to messages specifically transmitted to each wireless device 121. Such a broadcasted message for some or all wireless devices 121, 122 to restart their CSI measurements may advantageously be performed by the network node 110 when a large reconfiguration of transmitted CSI-RS resources is performed.

Another option is that the message may be transmitted as part of Downlink Control Information, DCI, to the at least one wireless device 121.

It also should be noted that the message may, for example, be a downlink message that is sent via a downlink control channel, such as, e.g. a Physical Downlink Control CHannel, PDCCH, or an enhanced PDCCH, ePDCCH. The downlink message may also be transmitted by Radio Resource Control, RRC, signalling. Thus, the message transmitted by the network node 110 may also be referred to a control message or control signalling message.

In some embodiments, the message may comprise an indication to use CSI estimates corresponding to a determined period of time. This means that the network node 110 may control the time frame during which the CSI-process has collected CSI measurements used in determining the CSI estimates. For example, the message may detail for how long a CSI measurement is to be considered "fresh" or valid before it must be discarded. This type of message may be directed by the network node 110 towards a specific wireless device 121 or broadcasted to some or all wireless devices 121, 122. The message may comprise, for example, the applicable CSI-process number or identity, and may specify, e.g. via an index, an indicator or by some appropriate unit of time, for how long CSI measurements may be used by a wireless device 121 for calculating or determining the CSI estimates.

According to one example, the network node 110 may also force a wireless device 121 to report CSI estimates without performing an averaging of the CSI measurements, so that the wireless device 121 only reports CSI estimates corresponding to the CSI measurements measured from a single time instant. The network node 110 may then, for example, perform its own averaging of the reported CSI estimates from several selected CSI measurement time instants.

Furthermore, in some embodiments, the message may comprise an indication of a determined period of time. The indication of the determined period of time may, for example, be an n-bit field for some value of n that covers a specified range of time values, e.g. in milliseconds or some other suitable time scale. The indication of the determined period of time may also be an index or indicator forming part of a range of indices or indicators which relate to a table in the wireless devices 121, 122 correlating the indices or indicators to specific time values.

Action 203

In this optional action, the network node 110 may receive a confirmation of the determined period of time from the one or more wireless devices 121, 122. This may be performed in case the network node 110 has transmitted a message comprising an indication to use CSI estimates corresponding to a determined period of time in Action 202. The confirmation may, for example, be received as a separate message or as part of the CSI report.

This advantageously enables the network node 110 to be notified that the wireless device 121 has received the message correctly. For example, in the case of a message directed by the network node 110 to a specific wireless device 121 for flushing CSI buffers of one or more CSI processes, the network node 110 will be notified that this message has been correctly received by the specific wireless device 121. Also, for example, in the case of a broadcasted message directed by the network node 110 to some or all wireless devices 121, 122 in a cell 115 for flushing CSI buffers of one or more CSI processes, the network node 110 will be notified of which of the some or all wireless devices 121, 122 in the cell 115 have correctly received the message. It also follows that the network node 110 is thus notified whether the message was correctly decoded by the wireless devices 121, 122, that is, that the message was decoded early enough to measure for as long a time frame as requested in the indication before reporting the CSI estimates in the CSI reports.

It should be noted that an advantage of the embodiments described above is that an improved control in the network node 110 of the validity of the CSI estimates in received CSI reports is provided.

Furthermore, stale or obsolete CSI measurements may, according to the embodiments described herein, be discarded or purged by the network node 110 without having to transmit RRC reconfiguration messages, i.e. minimizing RRC signalling. Further advantages comprise the fact that the time frame during which the CSI measurement has been obtained may be known in the network node 110, and the precise ways in which the CSI estimates in the CSI reports have been determined or calculated may be known in the network node 110. These advantages also provide the network node 110 with an improved basis when making downlink scheduling decisions.

Figure 3:
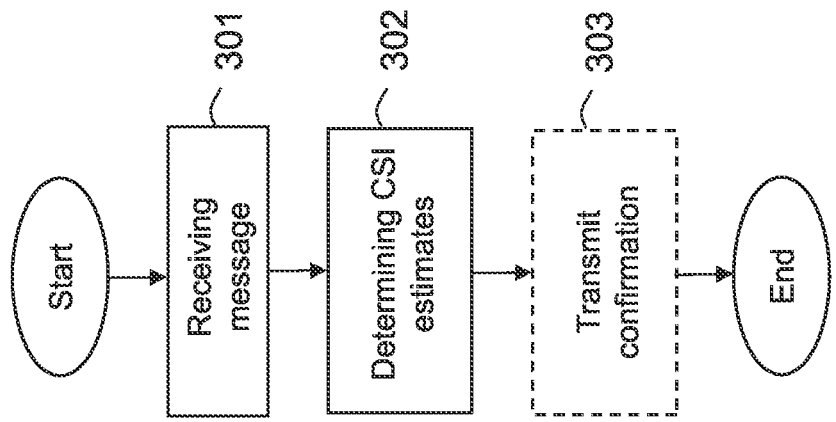
FIG. 3 is a flowchart depicting embodiments of a method in a wireless device.

Example of embodiments of a method performed by a wireless device 121 for determining Channel State Information, CSI, estimates to be transmitted in a CSI report for at least one CSI process configured for the wireless device 121 to a network node 110 in a radio communications network 100, will now be described with reference to the flowchart depicted in FIG. 3. FIG. 3 is an illustrated example of actions or operations which may be taken by the wireless device 121. The method may comprise the following actions.

Action 301

The wireless device 121 receives a message comprising an indication to discard existing CSI estimates and/or an indication to use CSI estimates corresponding to a determined period of time.

According to some embodiments, the message may be received as part of a Radio Resource Control, RRC, reconfiguration message to the wireless device 121 in order to reconfigure the at least one CSI process. The message may also be received as part of a broadcasted reconfiguration message in order to reconfigure the at least one CSI process. Another option is that the message may be received as part of Downlink Control Information, DCI, to the wireless device 121.

Action 302

After receiving the message in Action 301, the wireless device 121 determines CSI estimates to be used in the CSI report to the network node 110 according to the received indication.

The wireless device 121 is continuously buffering CSI measurements based on at least CSI-RS resources, and potentially also CSI-IM resources, to determine or compute CSI estimates for a given CSI process, such as, for example, Channel-Quality Indicator(s) (CQI), Rank Indicator (RI), and Precoding Matrix Indicator (PMI). So, for example, based on the indication in the message, the wireless device 121 may stop accumulating and averaging its current CSI measurements, and begin over again with an empty CSI buffer to collect new CSI measurements for determining CSI estimates. Thus, in some embodiments, when an indication to discard existing CSI estimates is received, the wireless device 121 may discard all existing CSI estimates and determine new CSI estimates. This may comprise discarding both existing CSI estimates determined via CSI-RS resources associated with the at least one CSI process, i.e. the CSI-RS buffer(s), and existing CSI estimates determined via CSI-IM resources associated with the at least one CSI process, i.e. CSI-IM buffer(s).

Alternatively, when the indication in the message indicates to discard CSI estimates determined via at least CSI-RS resources associated with the at least one CSI process, the wireless device 121 may discard existing CSI estimates determined via at least CSI-RS resources associated with the at least one CSI process. Here, the wireless device 121 may discard only the existing CSI estimates determined via CSI-RS resources associated with the at least one CSI process, i.e. flush the content of the CSI-RS buffer(s), and determine new CSI estimates.

Furthermore, when the indication in the message indicates to discard CSI estimates determined via at least CSI-IM resources associated with the at least one CSI process, the wireless device 121 may discard existing CSI estimates determined via at least CSI-IM resources associated with the at least one CSI process. Here, the wireless device 121 may discard only the existing CSI estimates determined via CSI-IM resources associated with the at least one CSI process, i.e. flush the content of the CSI-IM buffer(s), and determine new CSI estimates.

In some embodiments, when the indication in the message indicates to use CSI estimates corresponding to a determined period of time, the wireless device 121 may, according to some embodiments, discard existing CSI estimates which do not correspond to the determined period of time and determine new CSI estimates which correspond to the determined period of time. The indication of the determined period of time may, for example, be an n-bit field for some value of n that covers a specified range of time values, e.g. in milliseconds or some other suitable time scale. The indication of the determined period of time may also be an index or indicator forming part of a range of indices or indicators which relate to a table in the wireless devices 121 correlating the indices or indicators to specific time values.

It should be noted that the indication of the determined period of time may also indicate that both existing CSI measurements and new CSI measurements made within the determined period of time is to be used by the wireless device 121 when determining the CSI estimates, or that only new CSI measurements made within the determined period of time is to be used by the wireless device 121 when determining the CSI estimates.

Action 303

In this optional action, the wireless device 121 may transmit a confirmation of the determined period of time to the network node 110. This may be performed in case the wireless device 121 has received a message comprising an indication to use CSI estimates corresponding to a determined period of time in Action 301. The confirmation may, for example, be sent as a separate message or as part of the CSI report to the network node 110.

Figure 4:
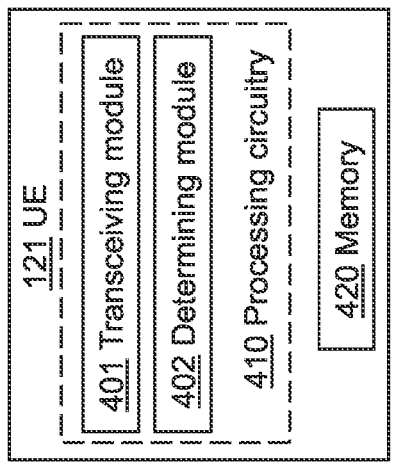
FIG. 4 is a schematic block diagram depicting embodiments of a wireless device.

To perform the method actions in the first wireless device 121 for determining CSI estimates to be transmitted in a CSI report for at least one CSI process configured for the wireless device 121 to a network node 110 in the radio communications network 100, the first wireless device 121 may comprise the following arrangement depicted in FIG. 4. FIG. 4 shows a schematic block diagram of embodiments of the first wireless device 121. In some embodiments, the first wireless device 121 may comprise a transceiving module 401 and a determining module 402. In some embodiments, the first wireless device 121 may comprise a processing circuitry 410, which may also be referred to as processing module, processing unit or processor. The processing circuitry 410 may comprise one or more of the transceiving module 401 and the determining module 402, and/or itself perform the function thereof described below.

The first wireless device 121 is configured to, e.g. by means of the transceiving module 401, receive a message comprising an indication to discard existing CSI estimates and/or an indication to use CSI estimates corresponding to a determined period of time. Also, the first wireless device 121 is configured to, e.g. by means of the determining module 402, determine CSI estimates to be used in the CSI report to the network node 110 according to the received indication.

In some embodiments, the first wireless device 121/the determining module 402 may be configured to discard all existing CSI estimates and determine new CSI estimates when an indication to discard existing CSI estimates is received. In some embodiments, the first wireless device 121/the determining module 402 may be configured to discard existing CSI estimates determined via at least CSI-RS resources associated with the at least one CSI process when the indication in the message indicates to discard CSI estimates determined via at least CSI-RS resources associated with the at least one CSI process. In some embodiments, the first wireless device 121/the determining module 402 may be configured to discard existing CSI estimates determined via at least CSI-IM resources associated with the at least one CSI process when the indication in the message indicates to discard CSI estimates determined via at least CSI-IM resources associated with the at least one CSI process.

In some embodiments, the first wireless device 121/the transceiving module 401 may be configured to receive the message as part of a Radio Resource Control, RRC, reconfiguration message to reconfigure the at least one CSI process, as part of a broadcasted reconfiguration message to reconfigure the at least one CSI process, or as part of Downlink Control Information, DCI.

In some embodiments, the first wireless device 121/the determining module 402 may be configured to discard existing CSI estimates which do not correspond to the determined period of time and determine new CSI estimates which correspond to the determined period of time when the indication in the message indicates to use CSI estimates corresponding to a determined period of time. In this case, the first wireless device 121/the determining module 402 may further be configured to, transmit a confirmation of the determined period of time to the network node 110.

The wireless device 121 in FIG. 4 may also be described as a wireless device 121 for determining CSI estimates to be transmitted in a CSI report for at least one CSI process configured for the wireless device 121 to a network node 110 in a radio communications network 100, comprising a transceiving module 401 for receiving a message comprising an indication to discard existing CSI estimates and/or an indication to use CSI estimates corresponding to a determined period of time, and a determining module 402 for determining CSI estimates to be used in the CSI report to the network node 110 according to the received indication. Also, the transceiving module 401 may also transmit a confirmation of the determined period of time to the network node 110.

The embodiments for determining CSI estimates to be transmitted in the CSI report for at least one CSI process configured for the wireless device 121 may be implemented through one or more processors, such as, e.g. the processing circuitry 410 in the first wireless device 121 depicted in FIG. 4, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 410 in the first wireless device 121. The computer program code may e.g. be provided as pure program code in the first wireless device 121 or on a server and downloaded to the first wireless device 121. The carrier may be one of an electronic signal, optical signal, radio signal, or computer readable storage medium, such as, e.g. electronic memories like a RAM, a ROM, a Flash memory, a magnetic tape, a CD-ROM, a DVD, a Blueray disc, etc.

The first wireless device 121 may further comprise a memory 420, which may be referred to or comprise one or more memory modules or units. The memory 420 may be arranged to be used to store executable instructions and data to perform the methods described herein when being executed in the first wireless device 121. Those skilled in the art will also appreciate that the processing circuitry 410 and the memory 420 described above may refer to a combination of analog and digital circuits, and/or one or more processors configured with software and/or firmware, e.g. stored in the memory 420, that when executed by the one or more processors such as the processing circuitry 410 perform the method as described above. The processing circuitry 410 and the memory 420 may also be referred to as processing means. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

From the above it may be seen that some embodiments may comprise a computer program product, comprising instructions which, when executed on at least one processor, e.g. the processing circuitry 410 or modules 401-402, cause the at least one processor to carry out the method for determining CSI estimates to be transmitted in a CSI report for at least one CSI process configured for the wireless device 121. Also, some embodiments may, as described above, further comprise a carrier containing said computer program, wherein the carrier is one of an electronic signal, optical signal, radio signal, or computer readable storage medium.

Figure 5:
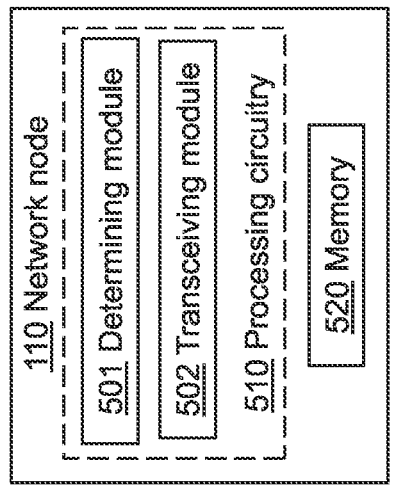
FIG. 5 is a schematic block diagram depicting embodiments of a network node.

To perform the method actions in the network node 110 for controlling CSI estimates transmitted by one or more wireless devices 121, 122 in CSI reports of at least one CSI process configured for the one or more wireless devices 121, 122 to the network node 110 in a radio communications network 100, the network node 110 may comprise the following arrangement depicted in FIG. 5.

FIG. 5 shows a schematic block diagram of embodiments of the network node 110. In some embodiments, the network node 110 may comprise a determining module 501 and a transceiving module 502. In some embodiments, the network node 110 may comprise a processing circuitry 510, which may also be referred to as processing module, processing unit or processor. The processing circuitry 510 may comprise one or more of the determining module 501 and the transceiving module 502, and/or perform the function thereof described below.

The network node 110 is configured to, e.g. by means of the determining module 501, determine that the CSI estimates from the one or more wireless devices 121, 122 are no longer valid due to change in at least one transmission condition. Also, the network node 110 is configured to, e.g. by means of the transceiving module 502, transmit, to the one or more wireless devices 121, 122, a message compris-ing an indication to discard existing CSI estimates and/or an indication to use CSI estimates corresponding to a determined period of time.

In some embodiments, wherein the network node 110/transceiving module 502 is configured for beamforming transmissions to the one or more wireless devices 121, 122 in the radio communications network 100, the change in the at least one transmission condition may be a change in transmitting beams used in beamforming transmissions to the one or more wireless devices 121, 122. In some embodiments, the change in the at least one transmission condition may be a change in the traffic situation in the cell 115 in which the one or more wireless devices 121, 122 is located. In some embodiments, the change in the at least one transmission condition may be a change in the determined period of time.

In some embodiments, the message may comprise an indication to discard CSI estimates determined via at least CSI-RS resources associated with the at least one CSI process. In some embodiments, the message may comprise an indication to discard CSI estimates determined via at least CSI-IM resources associated with the at least one CSI process.

In some embodiments, the network node 110/the transceiving module 502 may be configured to transmit the message as part of a Radio Resource Control, RRC, reconfiguration message to reconfigure the at least one CSI process, as part of a broadcasted reconfiguration message to reconfigure the at least one CSI process, or as part of Downlink Control Information, DCI.

In some embodiments, the message may comprise an indication to use CSI estimates corresponding to a determined period of time. In some embodiments, the message may comprise an indication of a determined period of time. In some embodiments, the network node 110/the transceiving module 502 may be configured to receive a confirmation of the determined period of time from the one or more wireless devices 121, 122.

The network node 110 in FIG. 5 may also be described as a network node 110 for controlling CSI estimates transmitted by one or more wireless devices 121, 122 in CSI reports of at least one CSI process configured for the one or more wireless devices 121, 122 to the network node 110 in a radio communications network 100, comprising a determining module 501 for determining that the CSI estimates from the one or more wireless devices 121, 122 are no longer valid due to change in at least one transmission condition, and a transceiving module 502 for transmitting, to the one or more wireless devices 121, 122, a message comprising an indication to discard existing CSI estimates and/or an indication to use CSI estimates corresponding to a determined period of time.

The embodiments for controlling CSI estimates transmitted by one or more wireless devices 121, 122 in CSI reports may be implemented through one or more processors, such as, e.g. the processing circuitry 510 in the network node 110 depicted in FIG. 5, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 510 in the network node 110. The computer program code may e.g. be provided as pure program code in the network node 110 or on a server and downloaded to the network node 110. The carrier may be one of an electronic signal, optical signal, radio signal, or computer readable storage medium, such as, e.g. electronic memories like a RAM, a ROM, a Flash memory, a magnetic tape, a CD-ROM, a DVD, a Blueray disc, etc.

Thus, the network node 110 may further comprise a memory 520, which may be referred to or comprise one or more memory modules or units. The memory 520 may be arranged to be used to store executable instructions and data to perform the methods described herein when being executed in the network node 110, the processing circuitry 510 and/or modules 501-502. Those skilled in the art will also appreciate that the processing circuitry 510 and the memory 520 described above may refer to a combination of analog and digital circuits, and/or one or more processors configured with software and/or firmware, e.g. stored in the memory 520, that when executed by the one or more processors, such as, the processing circuitry 510 and/or modules 501-502, cause the one or more processors to perform the method as described above. The processing circuitry 510 and the memory 520 may also be referred to as processing means. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

From the above it may be seen that some embodiments may comprise a computer program product, comprising instructions which, when executed on at least one processor, e.g. the processing circuitry 510 or modules 501-502, cause the at least one processor to carry out the method for controlling CSI estimates transmitted by one or more wireless devices 121, 122 in CSI reports. Also, some embodiments may further comprise a carrier containing said computer program product, wherein the carrier is one of an electronic signal, optical signal, radio signal, or computer readable storage medium.

The terminology used in the detailed description of the particular embodiments illustrated in the accompanying drawings is not intended to be limiting of the described methods, wireless device 121 and the network node 110, which instead should be construed in view of the enclosed claims.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

Abbreviations

CQI Channel-Quality Indicator
CSI Channel-State Information
CSI-IM Channel-State Information—Interference Measurement
CSI-RS Channel-State Information—Reference Signal
DL Downlink
DMRS Demodulation Reference Signals
eNB evolved NodeB
ePDCCH enhanced Physical Downlink Control Channel
FDD Frequency-Division Duplex
LTE Long-Term Evolution
PDCCH Physical Downlink Control Channel
PMI Precoding Matrix Indicator
RI Rank Indicator
RRC Radio Resource Control
TDD Time-Division Duplex
TTI Transmission-Time Interval
UE User Equipment
UL Uplink
ZP Zero Power

The invention claimed is:

1. A method performed by a User Equipment, UE, for determining Channel State Information, CSI, estimates to be transmitted in a CSI report to a base station in a radio communications network, the method comprising:
   receiving a message comprising an indication to use CSI estimates that are based on CSI measurements performed during a determined period of time on resources configured for the UE;
   discarding existing CSI estimates when there is a change in at least one transmission condition for the UE;
   determining CSI estimates to be used in the CSI report to the base station according to the received indication, wherein the CSI estimates are based on a CSI measurement at a single time instant on a Channel State Information Reference Signal, CSI-RS, resource configured for the UE; and
   transmitting the CSI report to the base station, the CSI report including the determined CSI estimates.

2. The method according to claim 1, wherein the CSI estimates are further based on a CSI measurement on a Channel State Information Interference Management, CSI-IM, resource at a single time instant.

3. The method according to claim 1, wherein the message is a Radio Resource Control, RRC, configuration message.

4. The method according to claim 1, further comprising transmitting a confirmation of the determined period of time to the base station.

5. A User Equipment, UE, for determining Channel State Information, CSI, estimates to be transmitted in a CSI report to a base station in a radio communications network, the wireless device comprising one or more processors whereby the wireless device is configured to:

receive a message comprising an indication to use CSI estimates that are based on CSI measurements performed during a determined period of time on resources configured for the UE;

discard existing CSI estimates when there is a change in at least one transmission condition for the UE;

determine CSI estimates to be used in the CSI report to the base station according to the received indication, wherein the CSI estimates are based on a CSI measurement at a single time instant on a Channel State Information Reference Signal, CSI-RS, resource configured for the UE; and transmit the CSI report to the base station, the CSI report including the determined CSI estimates.

6. The UE according to claim 5, wherein the CSI estimates are further based on a CSI measurement on a Channel State Information Interference Management, CSI-IM, resource at a single time instant.

7. The UE according to claim 5, wherein the message is a Radio Resource Control, RRC, configuration message.

8. The UE according to claim 5, further configured to transmit a confirmation of the determined period of time to the base station.

9. A method performed by a base station for controlling Channel State Information, CSI, estimates transmitted by a User Equipment, UE, in CSI reports to the base station in a radio communications network, the method comprising:

determining that the CSI estimates from the UE are no longer valid due to a change in at least one transmission condition;

transmitting, to the UE, a message comprising an indication to use CSI estimates that are based on CSI measurements performed during a determined period of time on resources configured for the UE; and receiving a CSI report from the UE, the CSI report including CSI estimates determined by the UE after discarding existing CSI estimates and in accordance with the indication to use CSI estimates that are based on CSI measurements performed during a determined period of time on resources configured for the UE, wherein the CSI estimates are based on a CSI measurement at a single time instant on a Channel State Information Reference Signal, CSI-RS, resource configured for the UE.

10. The method according to claim 9, wherein the base station is configured for beamforming transmissions to the UE in the radio communications network, and wherein the change in the at least one transmission condition is a change in a transmitting beam used in beamforming transmissions to the UE.

11. The method according to claim 9, wherein the change in the at least one transmission condition is a change in a traffic situation in a cell in which the UE is located, or a change in the determined period of time.

12. The method according to claim 9, wherein the CSI estimates are further based on a CSI measurement on a Channel State Information Interference Management, CSI-IM, resource at a single time instant.

13. The method according to claim 9, wherein the message is a Radio Resource Control, RRC, configuration message.

14. The method according to claim 9, wherein the message comprises an indication of the determined period of time.

15. The method according to claim 9, further comprising:
receiving a confirmation of the determined period of time from the UE.

16. A base station for controlling Channel State Information, CSI, estimates transmitted by a User Equipment, UE, in a CSI report to the base station in a radio communications network, the base station comprising:

at least one processor;

memory storing executable computer programs, whereby when executed by the at least one processor, the base station is configured to:

determine that the CSI estimates from the UE is no longer valid due to a change in at least one transmission condition;

transmit, to the UE, a message comprising an indication to use CSI estimates that are determined by the UE after discarding existing CSI estimates and based on CSI measurements performed during a determined period of time on resources configured for the UE.

17. The base station according to claim 16, wherein the base station is configured for beamforming transmissions to the UE in the radio communications network, and wherein the change in the at least one transmission condition is a change in a transmitting beam used in beamforming transmissions to the UE.

18. The base station according to claim 16, wherein the change in the at least one transmission condition is a change in a traffic situation in a cell in which the UE is located, or a change in the determined period of time.

19. The base station to claim 16, wherein the CSI estimates are further based on a CSI measurement on a Channel State Information Interference Management, CSI-IM, resource at a single time instant.

20. The base station according to claim 16, wherein the message is a Radio Resource Control, RRC, configuration message.

21. The base station according to claim 16, wherein the message comprises an indication of the determined period of time.

22. The base station according to claim 16, wherein the base station is further configured to:
receive a confirmation of the determined period of time from the UE.

* * * * *

UNITED STATES PATENT AND TRADEMARK OFFICE
CERTIFICATE OF CORRECTION

PATENT NO. : 11,606,800 B2
APPLICATION NO. : 17/193077
DATED : March 14, 2023
INVENTOR(S) : Frenne et al.

Page 1 of 2

It is certified that error appears in the above-identified patent and that said Letters Patent is hereby corrected as shown below:

In the Specification

In Column 1, Line 10, delete "9,986,573," and insert -- 9,986,573 B2, --, therefor.

In Column 2, Lines 10-11, delete "radio base stations nodes," and insert -- radio base station nodes, --, therefor.

In Column 2, Lines 44-45, delete "Channel-State Information Reference Symbols, CSI-RS," and insert -- Channel-State Information Reference Signal, CSI-RS, --, therefor.

In Column 5, Line 6, delete "device." and insert -- device, --, therefor.

In Column 5, Line 27, delete "(WiMax)," and insert -- (WiMAX), --, therefor.

In Column 5, Lines 53-54, delete "radio communication network" and insert -- radio communications network --, therefor.

In Column 5, Line 62, delete "cell 101" and insert -- cell 115 --, therefor.

In Column 6, Line 44, delete "TT's." and insert -- TTIs. --, therefor.

In Column 8, Line 22, delete "CSI-Reference Symbol, CSI-RS," and insert -- CSI-Reference Signal, CSI-RS, --, therefor.

In Column 8, Lines 27-28, delete "Non Zero Power," and insert -- Non-Zero Power, --, therefor.

In Column 8, Line 32, delete "or Zero Power, NZP," and insert -- or Non-Zero Power, NZP, --, therefor.

In Column 13, Line 10, delete "Blueray disc," and insert -- Blu-ray disc, --, therefor.

Signed and Sealed this
Seventh Day of November, 2023

Katherine Kelly Vidal
*Director of the United States Patent and Trademark Office*

In Column 15, Line 3, delete "Blueray disc," and insert -- Blu-ray disc, --, therefor.

In the Claims

In Column 18, Line 42, in Claim 19, delete "The base station to claim" and insert -- The base station according to claim --, therefor.